(12) United States Patent
Morris et al.

(10) Patent No.: US 8,144,757 B2
(45) Date of Patent: Mar. 27, 2012

(54) SYSTEM AND METHOD FOR ESTIMATING PROBABILITIES OF EVENTS

(75) Inventors: Joel M. Morris, Columbia, MD (US); Ronald Hozloehner, Munich (DE); Amitkumar Mahadevan, Baltimore, MD (US); Curtis R. Menyuk, Silver Spring, MD (US); John W. Zweck, Columbia, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 438 days.

(21) Appl. No.: 12/178,355

(22) Filed: Jul. 23, 2008

(65) Prior Publication Data

US 2009/0182536 A1    Jul. 16, 2009

Related U.S. Application Data

(63) Continuation of application No. 10/890,134, filed on Jul. 14, 2004, now abandoned.

(60) Provisional application No. 60/486,970, filed on Jul. 14, 2003.

(51) Int. Cl.
    *H04B 3/46*        (2006.01)

(52) U.S. Cl. ............................................. 375/227
(58) Field of Classification Search .................. 375/224, 375/227, 228; 714/751, 752; 703/2
    See application file for complete search history.

(56) References Cited

U.S. PATENT DOCUMENTS 7,068,896 B1 *  6/2006  Kath et al. ................... 385/123

* cited by examiner

*Primary Examiner* — Sam K Ahn
(74) *Attorney, Agent, or Firm* — Rene A. Vazquez, Esq.

(57) ABSTRACT

A dual adaptive importance-sampling system and method is provided that can estimate the probability of events by combining dual complementary importance-sampling simulations. The present invention exploits the ability to determine an optimal biased pdf using an iterative procedure that requires relatively little a priori knowledge of how to bias. Hence, the present invention is particularly suited for evaluating the BERs and/or WERs of coded communication and storage systems, and is generally applicable to arbitrarily chosen codes. When applied to coded communication and storage systems, the present invention provides a versatile technique for the fast and accurate estimation of BERs and WERs of FEC codes down to values of $10^{-20}$ or lower.

18 Claims, 6 Drawing Sheets

Data for WER simulation example, where Fig. 4a shows unconstrained ($p(V,E)$), constrained ($p(V|E)$), and scaled constrained ($p(V|E)p(E)$); and Fig. 4b shows histogram $G_k$, $k = 1,...,M$, Dashed curve: Pdf of V.
Dots: joint pdf of V and errors, both from the unconstrained simulation.
Dash-dot curve: pdf of V conditioned on errors from constrained simulation.
Solid curve: joint pdf of V and errors obtained by scaling dash-dot curve to fit the dots for $V > 0.55$.
Circles: Number of decoder errors in the unconstrained simulation.

Cross and plus symbols: MC BER and WER estimates, respectively.
Dashed curve with squares and dash-dot curve with circles: DAIS BER and WER, respectively.
Solid and dotted curves: BER and WER union bound approximations, respectively, based on codewords at Hamming weight 6 and 8

Fig. 6

SYSTEM AND METHOD FOR ESTIMATING PROBABILITIES OF EVENTS

REFERENCE TO RELATED APPLICATIONS

This application is a Continuation of U.S. application Ser. No. 10/890,134, filed Jul. 14, 2004, now abandoned which claims the benefit of U.S. Provisional Application No. 60/486,970, filed Jul. 14, 2003. The entire disclosure of the prior applications are considered as being part of the disclosure of the accompanying application and are hereby incorporated by reference therein.

GOVERNMENT RIGHTS

This invention was made with government support under Grant Nos. MDA904-01-C0940/Z949001 and MDA904-02-C0428/Z956801 awarded by the Department of Defense. The government has certain rights in this invention.

BACKGROUND OF THE INVENTION

1. Field of the Invention

The present invention relates to estimating the probabilities of events and, more particularly, to a dual adaptive importance-sampling system and method.

2. Background of the Related Art

In the field of communications engineering, the performance of forward error correction (FEC) codes in digital communication systems is almost exclusively studied and compared on the basis of performance curves—plots of bit-error rate (BER) and/or word-error rate (WER) versus the information signal power to noise power ratio (SNR).

The exact analytical evaluation of FEC code performance curves under a specific decoding scheme is extremely difficult to perform and computationally intractable, even for moderately long codes, say with more than 30 to 40 information bits per codeword.

Approximate performance of FEC codes under certain decoding schemes, in the form of lower and upper bounds, may be obtained analytically provided knowledge of the weight enumerator function (WEF) of the code is available: partial knowledge of the WEF in the form of the first non-trivial term may also suffice. In general, these bounds serve as very good approximations to the actual code performance at high SNR values. The quality of the approximations, however, is not very good at relatively moderate-to-low values of SNR. To make matters worse, unless the code belongs to one of the few classes of codes whose WEF is already known, such as the RS and BCH codes that still abound in practical FEC schemes, the computation of the code WEF or even the first non-trivial term is itself intractable, in a practical sense, for codes of practical size.

Thus, in general, for a large set of codes with parameters in the realm of current practical applicability (hundreds and thousands of bits long), it is impossible for FEC code researchers and developers to analytically obtain performance curves, either exact or in the form of bounds. Consequently, for some time now, the preferred methodology employed by communications engineers and researchers to study code performance has and continues to be based on performing Monte Carlo computer simulations or physical system experiments. For the simpler and less powerful codes, simulation software packages, such as Mathwork's MATLAB or Elanix's SystemView, provide communications oriented simulation tools (e.g., MATLAB's Communication ToolBox and SimuLink) that perform straight Monte Carlo simulation of BERs.

Monte Carlo simulations and physical system experiments, which are collectively referred to herein as "standard Monte Carlo techniques", have been quite effective in obtaining performance curves down to BER values as low as approximately $10^{-7}$. These BERs are consistent with performance requirements for such communication systems as ADSL and wireless phone systems. Attempting to obtain performance curves for lower values of BER, however, continues to be a challenge even with current computing capabilities because of the inordinate amounts of time required—on the order of months or years—to obtain meaningful results at such low BER values.

Recent technological advancements have drastically altered the scenario in the communications industry. The industry has witnessed an explosion in communications speeds and capacity of storage media, in addition to improvements in the overall quality of communications. This has led service providers to impose more stringent requirements on the error rate of communication systems, e.g., current optical fiber communication (OFC) systems operate at design BERs in the range of $10^{-12}$ to $10^{-15}$. Unfortunately, standard Monte Carlo techniques prove to be inadequate for evaluating FEC codes and decoders at such low BER values.

In an attempt to extend the range of standard Monte Carlo techniques and provide some assistance in the evaluation of higher performing systems, researchers have called upon the services of supercomputers or system experiments. Both of these approaches are characterized by unduly long performance time requirements and, even then, the best reliable BERs that have been achieved are on the order of $10^{-10}$ or $10^{-11}$ and are acquired over time spans measured in months. This is very expensive to industry and researchers in terms of person hours and computer time.

The evaluation of BERs for an actual physical system, e.g., an exploratory development prototype, invariably involves the use of a bit-error-rate tester (BERT). BERTs designed to operate at the extremely high speeds of 40-48 giga-bits per second (Gbps) have been recently introduced in the market. They are capable of operating at 'full line rate', i.e., these BERTs can count each and every transmitted (and received) bit at speeds of up to 40-48 Gbps. With such devices, one can easily transmit and receive about $10^{15}$ bits in a period of about $2.5 \times 10^4$ seconds (i.e., <7 hours), thus enabling the evaluation of BERs reliably at least down to $10^{-13}$ (100/total number of bits) within a relatively short period of time. However, such BERTs are extremely expensive, costing on the order of $500,000.

In coded communication systems with long codes, the range of word-error rates (WERs) that can be reliably evaluated is less than the uncoded system by a factor equal to the length of the code. For example, consider a code of length $n=1.1 \times 10^3$, with $k=10^3$ information bits and a rate of $r=0.909$, employed on a communication system operating at an information transfer rate of 40 Gbps (i.e., a line rate of $40/r=44$ Gbps). Transmission and reception of $10^{15}$ information bits would require about $2.5 \times 10^4$ seconds. However, $10^{15}$ information bits correspond to only $10^{12}$ codewords. Thus, a reliable estimate of WER only down to $10^{-10}$ is possible. Further, if one assumes that every word that is not correctly decoded results in about 10 information bits in error (the average number of information bits in error per codeword in error is dependent on the minimum distance of the code and other code properties), one realizes that the transmission of $10^{15}$ information bits is capable of providing us with reliable BERs only down to $10^{-12}$, instead of the $10^{-13}$ that was possible in the uncoded system. The situation is further worsened as the code length increases. In addition to the above problem, the use of high-speed BERTs in conjunction with system experiments for evaluating the performance of coded communication systems is severely limited by a host of other constraints.

First, evaluation of a code at such high speeds requires that encoder/decoder hardware implementations capable at operating at the above-mentioned speeds be available. The fastest encoder/decoders available today operate around 1 Gbps. Consequently, practical coded communications systems that operate at speeds in the range of 10-40 Gbps require the multiplexing/demultiplexing of FEC encoder/decoders at the transmitter and receiver, thus increasing the complexity of the system. Further, fabricating encoder/decoders for any code that needs to be evaluated is generally not economically feasible because of the cost of manufacturing high-speed VLSI devices and the almost universal approach of software implementation for initial design and evaluation. To complicate matters even more, the new class of decoders use soft-information to perform soft-decision decoding. This information is obtained by multi-threshold-decisioning on the received signal, and is difficult to extract—commercially impractical—at 10-40 Gbps operating speeds. This virtually eliminates the possibility of evaluating soft-decision decoding performance of FEC codes using high-speed BERTs.

In addition, the high-speed BERTs are themselves quite expensive, i.e., the cost of the Ixia 2.4 Gbps BERT is greater than $10,000.00. BERTs capable of operating at higher speeds are even more expensive (e.g., about $500,000 for the 40-48 Gbps model). The costs of the BERT, of fabricating the encoder/decoders, of the auxiliary equipment, and of setting up the test-bench to evaluate the code, becomes prohibitive, making it practically impossible for researchers and small companies to evaluate their codes to the desired low values of BER using a physical system setup employing BERTs.

A variety of simulation techniques have been developed to evaluate FEC codes to progressively smaller BER values. One of the most promising areas in this context has been the study of importance sampling (IS) techniques. Importance sampling is based on increasing the frequency of occurrence of very low (important) error events defined by the channel noise probability density function (pdf) by generating these important events more frequently from a related biased pdf. However, for importance sampling to be effective for evaluating FEC codes and decoders, one must choose a biased pdf using some knowledge of which noise realizations are most likely to generate errors at each desired low BER.

The task of determining an appropriate biased pdf is FEC code specific. Most of the proposed techniques for evaluating FEC codes via importance sampling rely on using some code-property to obtain a rough estimate of the region in noise space that is a major contribution to the BER. For example, some techniques exploit the knowledge of the minimum-weight codewords to determine a suitable biased pdf. However, as discussed above, this knowledge is practically unobtainable for codes in general.

One technique, described in T. Yamane and Y. Katayama, "Bit Error Rate Analysis on Iterative Two-Stage Decoding of Two-Dimensional Codes by Importance Sampling", *Proc. 2003 IEEE Int'l. Conf. Commun.*, 11-15 May 2003, Anchorage, Ak., USA, uses knowledge of the error-correcting capability of codes (a code parameter that may not be known in general) in order to obtain a suitable biased pdf for IS. This technique is restricted to hard-decision decoding, and is particularly suited only for obtaining performance curves for serially concatenated coding schemes (product codes), where it is possible to easily characterize the error correcting capability of the constituent codes.

Another technique, described in B. Xia and W. E. Ryan, "On importance sampling for linear block codes", *Proc. 2003 IEEE Int'l. Conf. Commun.*, 11-15 May 2003, Anchorage, Ak., USA, use the regular structure of the bipartite graphs of certain codes to determine the biased pdf. For every codeword that is received, the BER evaluation using this IS technique is performed for only a single bit-position in the codeword. Standard Monte Carlo techniques, on the other hand, evaluate the BER for all n bit-positions for every received codeword of length n.

Hence, for the transmission and decoding of the same number of codewords (which can be assumed to take the same time for both IS as well as standard Monte Carlo techniques), the standard Monte Carlo technique evaluates n times as many bits as this IS technique. This is referred to as the 'divide-by-n' problem. This divide-by-n problem is likely to affect the efficiency of this IS technique relative to the standard Monte Carlo techniques for codes where n becomes large. In addition, this IS technique is predicated on the regular structure in the bipartite graph of codes, which justifies the analysis of a single bit-position in the code to estimate the BER of the entire code. A regular bipartite graph structure is obtained from regular low-density parity-check (LDPC) codes, but is usually not consistent with irregular LDPC codes or codes in general.

Accordingly, the IS techniques described above are inefficient and/or impractical for very-low-BER-requirement evaluation of arbitrarily chosen codes. Thus, there is clearly a technological need for a more time-efficient simulation tool for evaluating the BERs/WERs of coded communication and storage systems, as well as a tool for evaluating the probabilities of other rare events.

SUMMARY OF THE INVENTION

An object of the invention is to solve at least the above problems and/or disadvantages and to provide at least the advantages described hereinafter.

Therefore, an object of the present invention is to provide a system and method for evaluating very rare events.

Another object of the present invention is to provide a system and method for estimating the probabilities of very rare events.

Another object of the present invention is to provide a system and method for estimating the probabilities of very rare events in coded communications systems.

Another object of the present invention is to provide a system and method for evaluating very low BERs/WERs of FEC codes.

Another object of the present invention is to provide a multicanonical Monte Carlo simulation system and method for evaluating very low BERs/WERs of FEC codes.

Another object of the present invention is to provide a dual adaptive importance sampling system and method for evaluating very low BERs/WERs of FEC codes.

Another object of the present invention is to provide a system and method for combining the results of constrained and unconstrained importance-sampling simulations using a scaling technique.

To achieve at least the above objects, in whole or in part, there is provided a method of estimating the probability of occurrence of an event (E), including performing an adaptive unconstrained estimation of an optimal biased distribution for a multidimensional random variable (z) defined on a sample space ($\Gamma$), performing an importance-sampling (IS) simulation using the optimal biased distribution for z to yield a first result, performing an adaptive constrained estimation of an optimal biased distribution for z over regions of Γ where E occurs, performing an IS simulation using the optimal biased distribution for z, over regions of Γ where E occurs, to yield a second result, and estimating the probability of the occurrence of E based on the first and second results.

To achieve at least the above objects, in whole or in part, there is also provided a method of estimating the probability of occurrence of an event (E), given a known probability distribution (ρ(z)) of a multi-dimensional random variable (z) defined on a sample space (Γ), including determining a scalar mapping (V) from the multi-dimensional sample space (Γ) to a single-dimensional space, defining bins that partition a first range of values of V ($\Gamma_V^u$), such that values of V not in the range of values $\Gamma_V^u$ have a negligible probability of occurrence, performing adaptive unconstrained Metropolis simulations to iteratively estimate an optimal biased distribution for z, performing an IS simulation using the optimal biased distribution for z and an unconstrained Metropolis random walk to yield a first result, defining bins that partition a second range of values of V ($\Gamma_V^u$), such that values of V not in the range of values $\Gamma_V^u$ have a negligible contribution to the probability of occurrence of E, performing adaptive constrained Metropolis simulations to iteratively estimate an optimal biased distribution for z over regions of Γ where E occurs, performing an IS simulation using the optimal biased distribution for z over regions of Γ where E occurs and a constrained Metropolis random walk to yield a second result, and estimating the probability of occurrence of E based on the first and second results.

To achieve at least the above objects, in whole or in part, there is also provided a program storage device readable by a machine, tangibly embodying a program of instructions executable by the machine to perform method steps for estimating the probability of occurrence of an event (E), the method steps comprising performing an adaptive unconstrained estimation of an optimal biased distribution for a multi-dimensional random variable (z) defined on a sample space (Γ), performing an importance-sampling (IS) simulation using the optimal biased distribution for z to yield a first result, performing an adaptive constrained estimation of an optimal biased distribution for z over regions of Γ where E occurs, performing an IS simulation using the optimal biased distribution for z, over regions of Γ where E occurs, to yield a second result, and estimating the probability of the occurrence of E based on the first and second results.

To achieve at least the above objects, in whole or in part, there is also provided a program storage device readable by a machine, tangibly embodying a program of instructions executable by the machine to perform method steps for estimating the probability of occurrence of an event (E), given a known probability distribution (ρ(z)) of a multi-dimensional random variable (z) defined on a sample space (Γ), the method steps comprising determining a scalar mapping (V) from the multi-dimensional sample space (Γ) to a single-dimensional space, defining bins that partition a first range of values of V ($\Gamma_V^u$), such that values of V not in the range of values $\Gamma_V^u$ have a negligible probability of occurrence, performing adaptive unconstrained Metropolis simulations to iteratively estimate an optimal biased distribution for z, performing an IS simulation using the optimal biased distribution for z and an unconstrained Metropolis random walk to yield a first result, defining bins that partition a second range of values of V ($\Gamma_V^u$), such that values of V not in the range of values $\Gamma_V^u$ have a negligible contribution to the probability of occurrence of E, performing adaptive constrained Metropolis simulations to iteratively estimate an optimal biased distribution for z over regions of Γ where E occurs, performing an IS simulation using the optimal biased distribution for z over regions of Γ where E occurs and a constrained Metropolis random walk to yield a second result, and estimating the probability of occurrence of E based on the first and second results.

To achieve at least the above objects, in whole or in part, there is also provided a system, comprising a processor programmed with computer readable program code for performing an adaptive unconstrained estimation of an optimal biased distribution for a multi-dimensional random variable (z) defined on a sample space (Γ), performing an importance-sampling (IS) simulation using the optimal biased distribution for z to yield a first result, performing an adaptive constrained estimation of an optimal biased distribution for z over regions of Γ where E occurs, performing an IS simulation using the optimal biased distribution for z, over regions of Γ where E occurs, to yield a second result, and estimating the probability of the occurrence of E based on the first and second results; and a user interface in communication with the processor.

To achieve at least the above objects, in whole or in part, there is also provided a method of combining a first result from an unconstrained importance-sampling (IS) simulation with a second result from a constrained IS simulation, comprising receiving the first result, receiving the second result, and scaling the second result to fit the first result to yield a scaling factor.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The system and method of the present invention can automatically determine the biased pdf by using an iterative procedure that requires relatively little a priori knowledge of how to bias. Hence, the present invention is particularly suited for evaluating the BERs and/or WERs of coded communication and storage systems, and is generally applicable to arbitrarily chosen codes. When applied to coded communication and storage systems, the system and method of the present invention provides a versatile technique for the fast and accurate estimation of BERs and WERs of FEC codes down to values of $10^{-20}$ or lower. However, it should be appreciated that the system and method of the present invention can also be applied to the evaluation of other types of rare events.

The system and method of the present invention utilizes a technique hereinafter referred to as a "dual adaptive importance-sampling" (DAIS). The DAIS technique is based on the multicanonical Monte Carlo (MMC) technique, and is used to iteratively obtain approximate estimates of the optimal biased distribution on the underlying probability sample space (henceforth referred to as "sample space") for a coded communications system in order to accurately compute, via dual complementary IS Metropolis random-walk simulations, the probability of occurrence of coded communication system events, such as received or decoder error, down to extremely low values.

Figure 1:
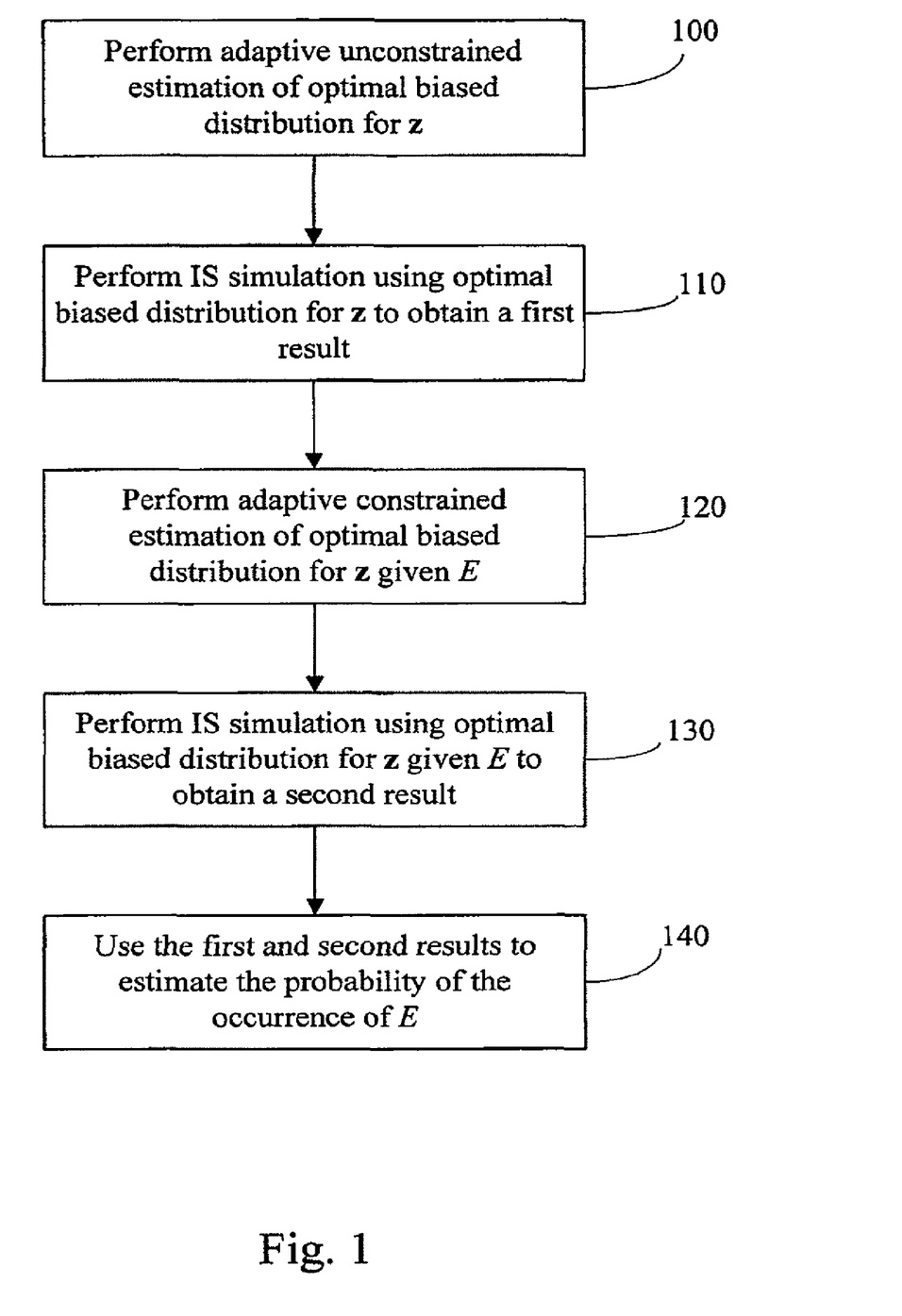
FIG. 1 is a flowchart showing the main steps of a dual adaptive importance sampling (DAIS) method of estimating the probability of the occurrence of an event, in accordance with one embodiment of the present invention.

FIG. 1 is a flowchart showing the main steps of a DAIS method of estimating the probability of the occurrence of an event, in accordance with one embodiment of the present invention. The method starts at step 100, where an adaptive unconstrained estimation of the optimal biased distribution of a multi-dimensional random variable (z) defined on the underlying sample space for the problem ($\Gamma$) is performed. The estimation is "unconstrained", in that it is not constrained to specific regions of the sample space. Then, at step 110, an IS simulation is performed using the optimal biased distribution for z to yield a first result.

At step 120, an adaptive constrained estimation of the optimal biased distribution for z is performed. This estimation is "constrained", in that it is constrained to regions of sample space where the rare event (E) is guaranteed to occur. Then, at step 130, an IS simulation is performed using the optimal biased distribution for z, given the occurrence of E, to yield a second result. At step 140, the first and second results are used to estimate the probability of the occurrence of E.

Although in the method of FIG. 1, the unconstrained estimation 100 and simulation 110 are shown as being performed before the constrained estimation 120 and simulation 130, it should be appreciated that the constrained estimation 120 and simulation 130 could be performed before unconstrained estimation 100 and simulation 110, while still falling within the scope of the present invention.

Figure 2:
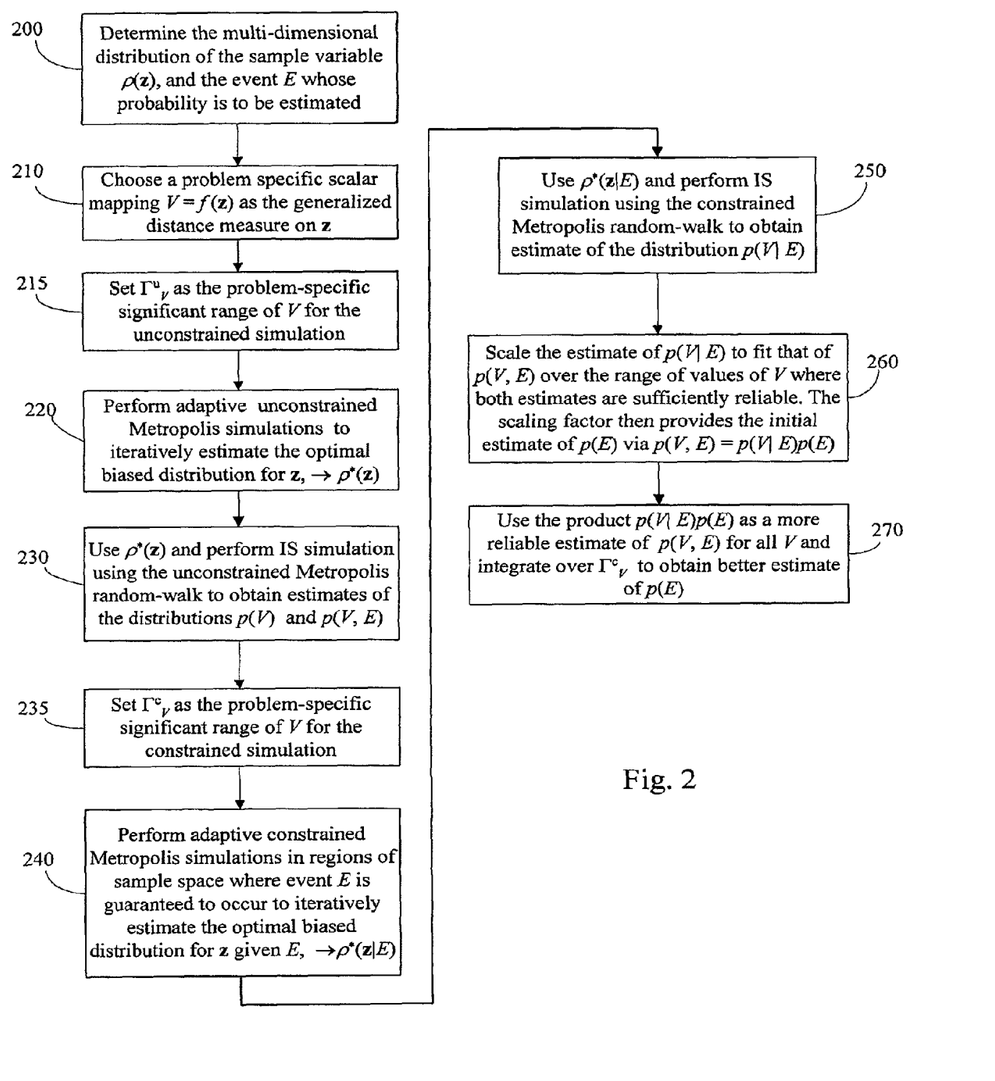
FIG. 2 is a flowchart showing a more detailed DAIS method of estimating the probability of the occurrence of an event, in accordance with a preferred embodiment of the present invention.

FIG. 2 is a flowchart showing a more detailed DAIS method of estimating the probability of the occurrence of an event, in accordance with a preferred embodiment of the present invention. The method starts at step 200, where the probability distribution ($\rho(z)$) of a multi-dimensional random variable (z) defined on a sample space ($\Gamma$), and the event E whose probability is to be estimated is specified.

As discussed above, z represents the multi-dimensional random variable defined on the underlying sample space, for the problem, with known probability distribution (pdf) $\rho(z)$. The occurrence of E is function of the value of z, and perhaps, other factors. However, specific regions in sample space where E occurs are unknown a priori.

At step 210, a scalar mapping V=f(z) from the multi-dimensional sample space to a single-dimensional space (such as the real line or its subset) is chosen that is problem-specific and may often represent some form of distance measure on the sample space (such as the $l_2$-norm) or modifications of such measures. A desirable mapping represents an ordering of easy-to-define regions in the sample space based on the relative probability of occurrence of event E.

At step 215, $\Gamma_V^u$ is set as the problem-specific significant range of V for the unconstrained simulation, such that values of V not in the range of values $\Gamma_V^u$ have a negligible probability of occurrence. At step 215, the region $\Gamma_V^u$ is also partitioned into a large number (M) of equal-width bins.

At step 220, adaptive unconstrained Metropolis simulations are performed to iteratively estimate the optimal biased distribution for z, i.e., $\rho^j(z) \rightarrow \rho^*(z)$. In this step, the Metropolis random-walk at each iteration is not constrained to specific regions of sample space (and equivalently regions of $\Gamma_V^u$). Then, at step 230, $\rho^*(z)$ is used to perform an IS simulation using the unconstrained Metropolis random-walk to obtain estimates of the distributions p(V) and p(V, E) from histograms $H_k$ and $G_k$, k=1, . . . , M, generated from accumulated values of V belonging to $\Gamma_V^u$ and $\Gamma_V^u \cap E$, respectively.

At step 235, $\Gamma_V^c$ is set as the problem-specific significant range of V for the constrained simulation, such that values of V not in the range of values $\Gamma_V^c$ have a negligible contribution to the probability of occurrence of E. Since P(E) is unknown a priori, $\Gamma_V^c$ has to be set in an ad-hoc fashion, and may have to be modified by trial and error. At step 235, the region $\Gamma_V^c$ is also partitioned into a large number (M) of equal-width bins. Then, at step 240, adaptive constrained simulations are performed to iteratively estimate the optimal biased distribution for z given E, i.e., $\rho^j(z|E) \rightarrow \rho^*(z|E)$. In this step, the Metropolis random-walk at each iteration is constrained to regions of sample space (and equivalently regions of $\Gamma_V^c$) where event E is guaranteed to occur. Then, at step 250, $\rho^*(z|E)$ is used to perform an IS simulation using the constrained Metropolis random-walk to obtain an estimate of the distribution p(V|E) from the histogram $H_k$, k=1, . . . , M, generated from accumulated constrained values of V belonging to $\Gamma_V^c$.

The results of the constrained and unconstrained IS Metropolis simulations are then combined at step 260 by scaling the estimate of p(V|E), obtained from the constrained simulation (step 250), to fit the estimate of p(V, E), obtained from the unconstrained simulation (step 230), over the range of values of V where both estimates are sufficiently reliable. This range is problem-specific, but is typically defined by those bins of $\Gamma_V^u$ that have a large fraction of accumulated values of V belonging to the event E during the unconstrained simulation.

The scaling factor then provides the initial estimate of P(E) via p(V, E)=p(V|E)P(E) over the range of values of V where both estimates are sufficiently reliable. Finally, at step 270, the product p(V|E)P(E) is used as a more reliable estimate of p(V, E) for all V, and one integrates p(V|E)P(E) over $\Gamma_V^c$ to obtain the better estimate of P(E).

As shown in FIGS. 1 and 2, and as described above, the DAIS method of the present invention performs the adaptive Metropolis simulations twice, under unconstrained and constrained assumptions on the generated simulation values for z, then combines both results to estimate the probability of the desired event.

Figure 3:
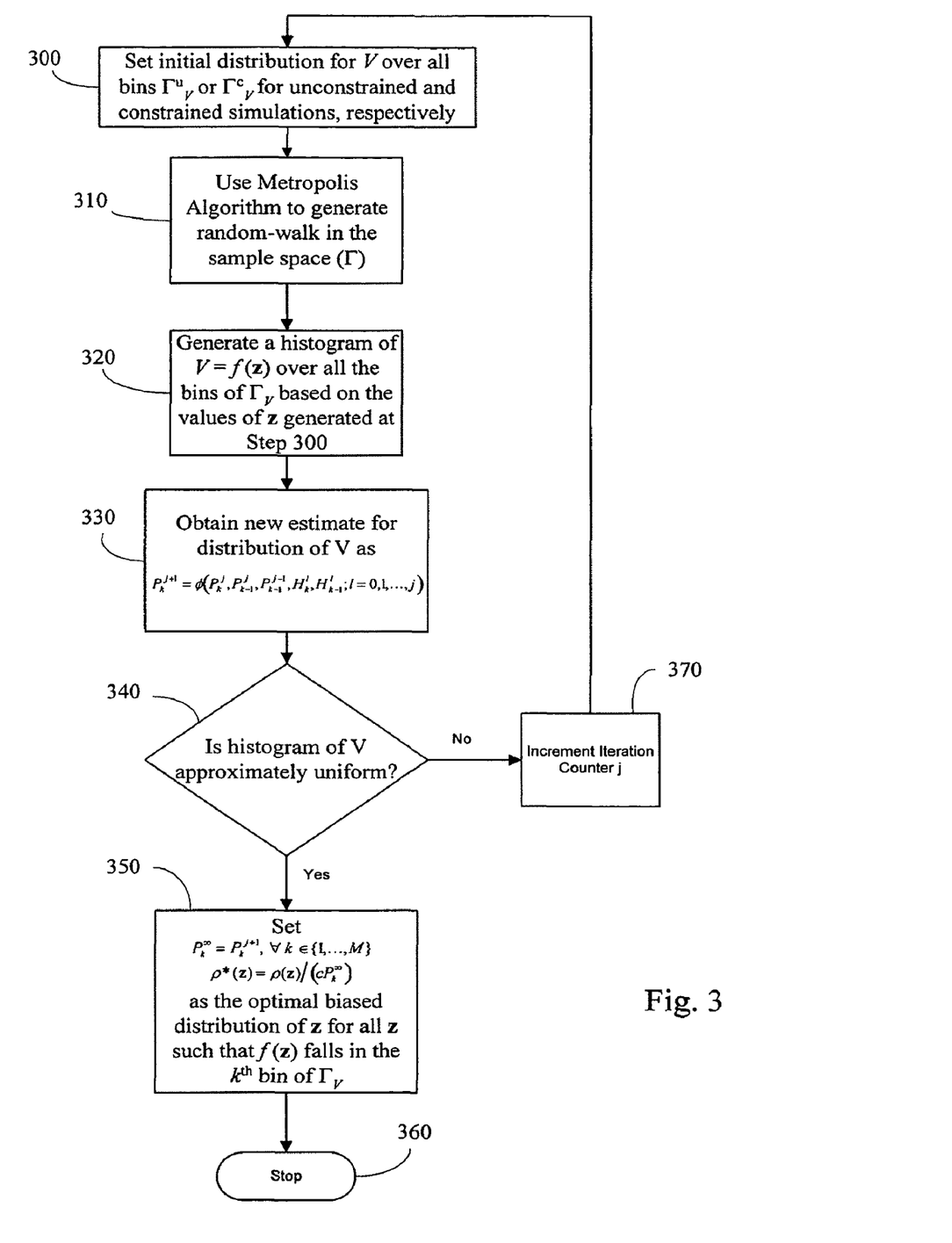
FIG. 3 is a flowchart of steps in one preferred method for performing adaptive unconstrained and constrained Metropolis simulations, in accordance with the present invention.

FIG. 3 is a flowchart of steps in one preferred method for performing steps 220 and 240 of FIG. 2 (the adaptive unconstrained and constrained Metropolis simulations, respectively). The method starts at step 300, where an initial distribution for V over all the bins of $\Gamma_V^u$ or $\Gamma_V^c$, for unconstrained or constrained simulations, respectively, is set. A natural choice is the uniform distribution, i.e., $P_k^l = M^{-1}$, $k=1, \ldots, M$, where the subscript represents the bin number and the superscript represents the iteration number.

Then, at step 310, a Metropolis algorithm is used to generate a random-walk in the sample space F according to the distribution $\rho^j(z) \propto \rho(z)/P_k^j$ for all z such that f(z) falls in the $k^{th}$ bin of $\Gamma_V^u$ or $\Gamma_V^c$. The method then proceeds to step 320, where a histogram is generated of V=f(z), i.e., $H_k^j$, $k=1, \ldots, M$, over all the bins of $\Gamma_V^u$ or $\Gamma_V^c$ based on the values of z generated by the Metropolis random-walk. At step 330, a new estimate for the distribution of V as $P_k^{j+1} = \phi(P_k^j, P_{k-1}^j, P_{k-1}^{j-1}, H_k^l, H_{k-1}^l; l=0, 1, \ldots, j)$ is obtained, where $\phi$ denotes a suitably defined function.

At step 340, it is determined if the histogram of V at the $j^{th}$ iteration is approximately uniform, i.e., $H_k^j \approx H_m^j$, $\forall k, m \in \{1, \ldots, M\}$, or equivalently, when $P_k^{j+1} \approx P_k^j$, $\forall k \in \{1, \ldots, M\}$. If the histogram is uniform, then the method proceeds to step 350. Otherwise, the method jumps to step 370.

At step 350, $P_k^\infty = P_k^{j+1}$, $\forall k \in \{1, \ldots, M\}$ and $\rho^*(z) = \rho(z)/(cP_k^\infty)$ is set as the optimal biased distribution of z for all z such that f(z) falls in the $k^{th}$ bin of $\Gamma_V^u$ or $\Gamma_V^c$, where c is chosen such that $\int \rho^*(z) dz = 1$. Specific examples of the update rule in step 350 are: (a)

$$P_k^{j+1} = \frac{P_{k-1}^{j+1} P_k^j}{P_{k-1}^j} \left( \frac{H_k^j}{H_{k-1}^j} \right)^{\hat{g}_{k-1}^j},$$

where $\hat{g}_{k-1}^j = \dfrac{g_{k-1}^j}{\sum_{l=1}^j g_{k-1}^l}$ and $g_{k-1}^l = \dfrac{H_k^l H_{k-1}^l}{H_k^l + H_{k-1}^l}$, and (b) $P_k^{j+1} \propto P_k^j H_k^j$.

The method then ends at step 360.

At step 370, the iteration counter j is incremented, and then steps 300-340 are repeated.

Figure 4A:
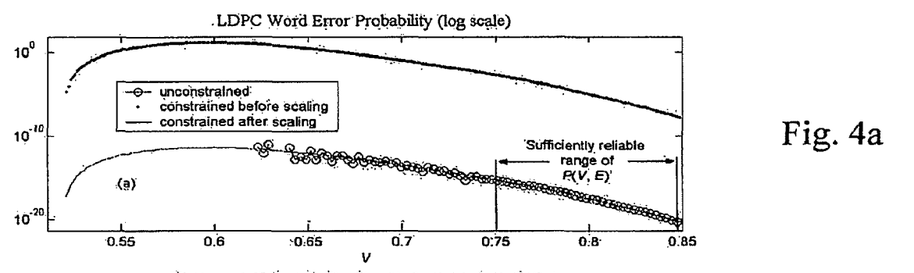
FIG. 4a is a plot showing an example of combining the results of unconstrained and constrained (before scaling) simulation results to obtain the scaling factor P(E) and the estimate p(V|E) P(E) of p(V, E) (constrained and after scaling), in accordance with the present invention.
Figure 4B:
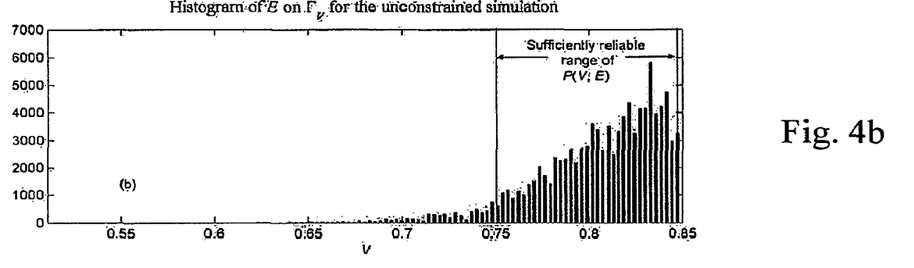
FIG. 4b is a histogram $G_k$, k=1, ..., M, of accumulated values of V belonging to $\Gamma_V^u \cap E$ generated during the unconstrained simulation for the example of FIG. 4a, in accordance with the present invention.

FIG. 4a is a plot showing an example of combining the results of unconstrained and constrained (before scaling) simulation results to obtain the scaling factor P(E) and the estimate P(V|E) P(E) of p(V, E) (constrained and after scaling). This data corresponds to the estimation of word error rate (WER) for a LDPC error correcting code and sum-product algorithm decoding. FIG. 4b displays the histogram $G_k$, $k=1, \ldots, M$, of accumulated values of V belonging to $\Gamma_V^u \cap E$ generated during the unconstrained simulation for this example.

Estimating BER of a Specific LDPC Error Correcting Code

As an illustrative example of one application of the present invention, the performance of a regular (96, 50) LDPC code with a code rate of r=50/96 in an additive white Gaussian noise (AWGN) channel with binary phase-shift-keying (BPSK) was studied using the DAIS method of the present invention. The parity-check matrix (H) of this code can be found in D. J. C. MacKay, "Encyclopedia of Sparse Graph Codes", which is incorporated by reference herein in its entirety (http://www.inference.phy.cam.ac.uk/mackay/codes/EN/C/96.3.963).

This code was chosen because it was: (1) the same code studied in B. Xia and W. E. Ryan, "On importance sampling for linear block codes," Proc. IEEE International Conference on Communications 2003 (ICC '03), pp. 2904-2908, Anchorage, Ak., 2003, which is incorporated by reference herein in its entirety; and (2) it is possible to exactly compute the first two non-trivial coefficients of the code's weight enumerator function (3 and 24 codewords at Hamming weights 6 and 8, respectively), which allows one to compare the simulation results with the code's union-bound performance. Note that the MacKay and Xia, et al., references noted above refer to this code as a (96, 48) code, but 2 of the 48 rows of H are linearly dependent.

Sum-product decoding (SPD) was implemented employing the log-likelihood modification of described in H. Futaki and T. Ohtsuki, "Performance of low-density parity-check (LDPC) coded OFDM systems," Proc. ICC '02, vol. 3, pp. 1696-1700, which is incorporated by reference herein in its entirety, and symmetric signal levels of +1 and −1 for logical 1s and 0s, respectively. The pdf $\rho_l$ of the noise in the $l^{th}$ bit at the receiver is zero mean Gaussian with variance $\sigma^2 = 1/(2r E_b/N_0)$. It suffices to transmit the all-zeros codeword, since the code is linear and the noise is symmetric.

Let $\Gamma$ be the n-dimensional probability space of the noise in the n bits of a codeword. The noise vector $z=(z_1, \ldots, z_n)$ is multivariate Gaussian with joint pdf $$\rho(z) = \prod_{l=1}^n \rho_l(z_l).$$

The MMC algorithm is controlled by a scalar control quantity V defined here as $$V(z) = \left\{ \frac{1}{n} \sum_{l=1}^n [H(q_l z_l) z_l]^2 \right\}^{1/2},$$

where $q_l = (-1)^{b_l}$, with $b_l$ being the transmitted bit in the $l^{th}$ position, and H(x)=1 if x>0 and H(x)=0 otherwise. V(z) is constructed so that a noise component $z_l$ contributes to V only if it may produce a bit-error at the input to the decoder. A received word with a noise realization z is characterized as generating an error, if the LDPC decoder cannot decode it to the transmitted codeword within 50 iterations.

Given a range $[V_{min}, V_{max}]$ for V, $\Gamma$ is partitioned into M subsets $\Gamma_k = \{z \in \Gamma | V_{k-1} \leq V(z) < V_k\}$, where $V_k = V_{min} + k\Delta V$, $1 \leq k \leq M$, and $\Delta V = V_k - V_{k-1} = (V_{max} - V_{min})/M$ is the width of each bin in the partition of $[V_{min}, V_{max}]$. Let $P_k$ be the probability of selecting a realization z from $\rho$ so that $z \in \Gamma_k$. Then, $$P_k = \int_\Gamma \chi_k(z) \frac{\rho(z)}{\rho^*(z)} \rho^*(z) dz \approx \frac{1}{N} \sum_{i=1}^N \chi_k(z^{*,i}) \frac{\rho(z^{*,i})}{\rho^*(z^{*,i})} \quad (1)$$

where $\rho^*(z)$ is a positive biasing pdf, $\chi_k(z)=1$ if $z \in \Gamma_k$ and $\chi_k(z)=0$ otherwise, and the $z^{*,i}$ are N random sample points in $\Gamma$, selected according to the pdf $\rho^*(z)$. The variance of the estimate of (1) is zero if the optimal biasing pdf $$\rho_{opt}^*(z) = \chi_k(z) \frac{\rho(z)}{P_k}$$

is used. However, $\rho_{opt}^*(z)$ depends on $P_k$, which is initially unknown. In standard IS, one uses physical intuition to guess a biasing pdf that is close to $\rho_{opt}^*$.

The MMC algorithm instead iterates over a sequence of biasing pdfs $\rho^{*,j}$ that approach $\rho_{opt}^*$. $\rho^{*,j}$ is defined for the $j^{th}$ iteration by $\rho^{*,j}(z)=\rho(z)/(c^j P_k^j)$, where k is such that $z \in \Gamma_k$ is satisfied. The quantities $P_k^j$ satisfy $$P_k^j > 0 \text{ and } \sum_{k=1}^{M} P_k^j = 1, \text{ and}$$

$c^j$ is an unknown constant that ensures $\int_{\Gamma} \rho^{*,j}(z)dz=1$. The vector $P_k^j$, k=1, . . . M, is the key quantity in the MMC algorithm and completely determines the bias. At the first MMC iteration, $P_k^1$ is usually set to 1/M, $\forall$k=1, . . . , M.

Within each MMC iteration j, the Metropolis algorithm is employed to produce a random walk of samples $z^{*,i}$ whose pdf equals $\rho^{*,j}(z)$. The Metropolis algorithm is described in N. Metropolis, et al., "Equation of state calculations by fast computing machines," *J. Chem. Phys.*, vol. 21, pp. 1087-1092, 1953, and is hereby incorporated by reference in its entirety.

A Markov chain of transitions consisting of small steps in the noise space is considered. Each transition goes from $z^{*,i}=z_a^* \in \Gamma_{k_a}$ to $z_b^{*=(z_a^* + \epsilon^j \Delta z)} \in \Gamma_{k_b}$, where $\Delta z$ is random and symmetric, i.e., it does not favor any direction in $\epsilon$, and the transition is accepted with probability $\pi_{ab}$. If a transition from $z^{*,i}$ to $z_b^*$ is accepted, $z^{*,i+1}=z_b^*$ is set, else $z^{*,i+1}=z^{*,i}=z_a^*$ is set. The ratio $\pi_{ab}/\pi_{ba}$ equals $\rho^{*,j}(z_b^*)/\rho^{*,j}(z_a^*)$, which is the detailed balance condition that ensures that the limiting (stationary) pdf for infinitely many steps of this random walk is $\rho^{*,j}$.

The perturbation of the noise component in each bit $z_{a,l}^*$ of $z_a^*$ is considered separately, and it is accepted or rejected independently with the probability $$\min\left[\frac{\rho_l(z_{b,l}^*)}{\rho_l(z_{a,l}^*)}, 1\right].$$

Each perturbation $\Delta z_l$ is picked from a zero mean symmetric pdf. A trial state $z_b^*$ is obtained in which only some of the components are different from their previous values in $z_a^*$. Next, $k_b$, the bin corresponding to $z_b^*$, is computed, and the step from $z_a^*$ to $z_b^*$ is accepted with the probability $$\min\left[\frac{P_{k_a}^j}{P_{k_b}^j}, 1\right].$$

In each iteration, the perturbation coefficient $\epsilon^j$ is constant for all samples. After each iteration, $\epsilon^j$ is adjusted so that the acceptance ratio $\alpha\square$ (number of accepted steps)/(total number of steps, N) is close to 0.3 (empirically chosen based on experience from previous experiments). The minimum required N for this random walk depends on the average step size $\alpha\epsilon^j \langle \Delta z \rangle$ and hence is system-dependent. The noise realizations are recorded in the histogram $H^{*,j}$, where $$H_k^{*,j} = \sum_{i=1}^{N} \chi_k(z^{*,i})$$

is the number of the $z^{*,i}$ in iteration j that fall into $\Gamma_k$. The $P_k^j$ are updated after each MMC iteration using the recursion relations given in B. A. Berg, "Algorithmic aspects of multi-canonical Monte Carlo simulations," *Nucl. Phys. Proc. Suppl.*, vol. 63, pp. 982-984, 1998, which is hereby incorporated by reference in its entirety, based on the histogram $H^{*,j}$. As j increases, the expected number of samples $\langle H_k^{*,j} \rangle$ becomes independent of the bin number k, which implies that $P_k^j \to P_k$.

Let $P_{err}$ be the probability that a received word with noise realization z selected according to pdf $\rho$ leads to an error, and $P_{err,k}$ the probability that z leads to an error and falls into bin k. Then $$P_{err,k} = P_{err|k} P_k = P_{k|err} P_{err}, \quad (2a)$$

$$P_{err} = \sum_{k=1}^{M} P_{err,k}, \quad (2b)$$

where $P_{err|k}$ and $P_{k|err}$ are the conditional probabilities of an error given that z falls into bin k, and vice versa. $P_{err}$ can be computed by first running an MMC simulation as described above, where we also count the errors in bin k to produce a histogram $G_k^{*,j}$. One can then approximate $$P_{err|k} \approx P_{err|k}^{jmax} = \sum_{j=1}^{jmax} \frac{G_k^{*,j}}{\sum_{j=1}^{jmax} H_k^{*,j}}$$

after $j_{max}$ MMC iterations. Summing over all MMC iterations is valid since the biasing pdf at any MMC iteration only affects the total number of hits in a bin, but not the behavior of error hits relative to the total hits within a bin. Finally, one can use the left equation of (2a), and equation (2b) to get $P_{err}$.

Figure 5A:
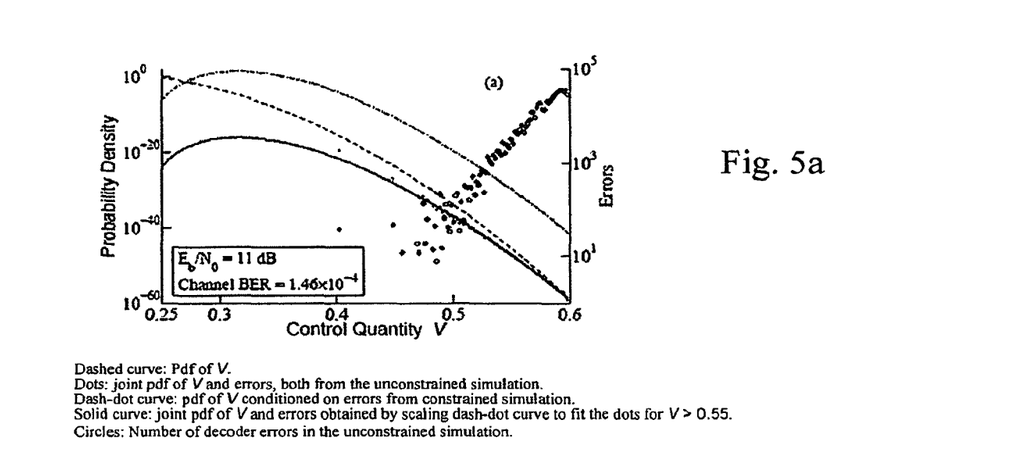
FIG. 5a is a plot showing a pdf of a scalar control quantity V, in accordance with the present invention.

In FIG. 5a, the approximation $(P_{err|k}^{jmax} P_k^{jmax+1})/\Delta V$ to $P_{err,k}/\Delta V$ is shown with dots for $E_b/N_0=11$ dB. The dashed line shows $P_k/\Delta V$, and the circles show the sum of the error histograms $$\sum_{j=1}^{jmax} G_k^{*,j}.$$

The number of sampled errors rapidly decreases to 0 as V decreases towards 0.4, which is where $P_{err,k}$ tends to be largest. Consequently, the approximation $P_{err,k} \approx P_{err|k}^{jmax}$ converges very slowly as the iteration number j increases. The reason is that in this unconstrained MMC simulation, not enough of the higher-probability smaller-noise realizations that generate errors have been sampled.

One efficient method to overcome this undersampling problem is to run a second, constrained MMC simulation (hence the term "dual" in DAIS), in which one only accepts Metropolis steps that lead to errors. If a trial realization $z_b^*$ does not yield an error in this simulation, we set $\pi_{ab}$ to zero. The constrained simulation, hence, takes its samples from $$\tilde{\rho}(z) = \chi_{err}(z)\frac{\rho(z)}{P_{err}},$$

where $\chi_{err}(z)=1$ if z produces an error and $\chi_{err}(z)=0$ otherwise. Note that $\tilde{\rho}(z)$ is proportional to $\rho(z)$ wherever $\chi_{err}(z)=$ 1. If the Metropolis random walk is ergodic in the error subset of $\Gamma$, the constrained MMC simulation approximates $P_{k|err}$. Since the $P_{err,k}$ and $P_{k|err}$ estimates obtained using the two simulations are both smooth for large k, using (2a) we can obtain $P_{err}=P_{err,k}/P_{k|err}$ from the data where k is large.

In FIG. 5a, the dash-dot line shows $P_{k|err}/\Delta V$ obtained from the constrained simulation, while the solid line shows the resulting $P_{err,k}/\Delta V$ obtained by scaling $P_{k|err}/\Delta V$ to fit $P_k/\Delta V$ from the unconstrained simulation for $0.55<V<0.6$. Since MMC yields a similar number of samples in each bin, the relative statistical sampling error of $P_{k|err}$ in the constrained simulation is smaller at small V than in the unconstrained simulation. A significant advantage of running separate unconstrained and constrained simulations is that the algorithm optimizes the perturbation coefficients $\epsilon^j$ of the two simulations independently. The values of $\epsilon^j$ tend to differ strongly between the two simulations.

In these simulations, M=300. In the first iteration $N^{j=1}=5000$ samples in the unconstrained case and $N^{j=1}=10000$ in the constrained case, and the number of samples is increased after each iteration so that $N^{j+1}=1.3N^j$. In each case, $P_k^1=1/M$, k=1, ..., M, and it is assumed that the simulation has sufficiently converged when max $|(P_k^j-P_k^{j+1})/P_k^{j+1}|<0.1$ This convergence requires $\approx 10^6$ to $10^8$ samples in total, with the samples increasing on average with increasing $E_b/N_0$. Also, in both cases, each MMC iteration is initialized with a z that gives a decoder error.

Figure 5B:
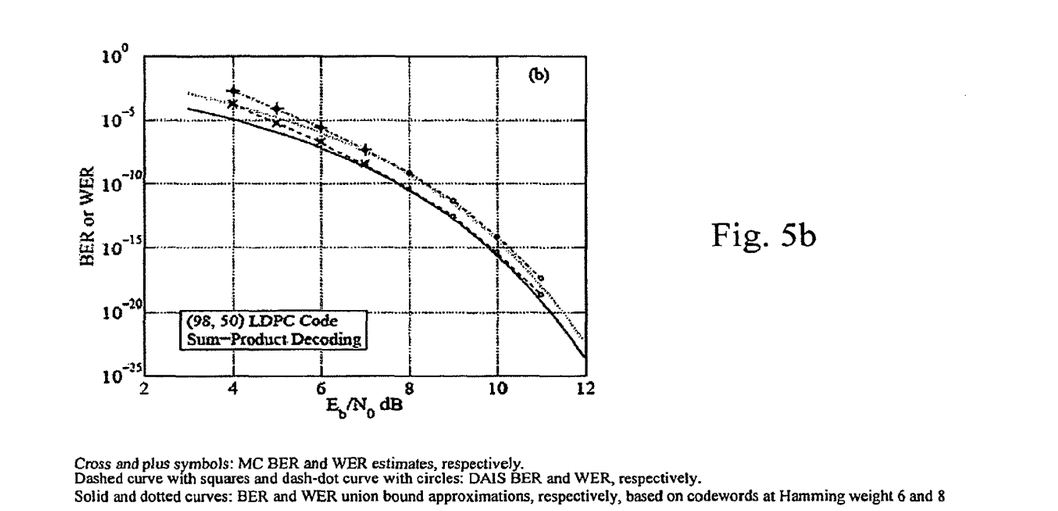
FIG. 5b is a plot of BER and WER estimates obtained using the methods of the present invention.

In FIG. 5b, the x and + symbols denote the decoder output BER and WER estimates, respectively, obtained via Monte Carlo (MC). The dashed curve with □ and dash-dot curve with ○ denote the decoder output BER and WER estimates, respectively, obtained using DAIS. Finally, the solid curve and dotted curve denote the BER and WER union bounds, respectively.

The union bound can be closely approximated at high $E_b/N_0$ by the contribution of low Hamming weight (6 and 8 in this case) codewords. The SPD for LDPC codes approximates the ML decoder. Hence, one would expect the SPD to perform worse than the union bound on ML decoding at high $E_b/N_0$. The results from DAIS are consistent with this expectation and indicate that DAIS can simulate WER and BER performance of codes at very low values. Excellent agreement is also observed between the results obtained by DAIS and MC, wherever MC results are available (DAIS falls within the 99% error bars for MC), which further validates DAIS.

The assertion that the true code performance should be close to the union bound at high $E_b/N_0$ is further bolstered by the observation that for MC simulations, as $E_b/N_0$ increases, the contribution of the probability of decoding-to-wrong codewords progressively dominates the WER. For example, at $E_b/N_0=4$ dB, 216 of 1888 word errors recorded were due to decoding to wrong codewords (the rest were decoder failures), whereas at $E_b/N_0=7$ dB, the corresponding numbers were 40 of 52. Note that the BER results in the B. Xia and W. E. Ryan reference are farther away from the union bound than the present results (by about 0.4 dB at BER=$10^{-9}$), which may be attributed to their use of $\leq 5$ iterations for the SPD, and possibly a different decoder implementation.

It is noted that the present BER data points do not show a waterfall region since they correspond to large $E_b/N_0$ relative to the Shannon limit ($\approx 0$ dB for the present code), and since the code is not very long. BER estimates down to $10^{-39}$ for a smaller (20, 7) code have also been obtained.

A measure of DAIS's improvements over MC is given by the ratio of the number of samples (codewords) required to achieve a given WER at a given $E_b/N_0$, e.g., at $E_b/N_0=10$ dB, WER$\approx 10^{-14}$ is obtained by DAIS using $8 \times 10^7$ codewords (unconstrained)+$3 \times 10^7$ codewords (constrained)=$11 \times 10^7$ codewords (total), whereas MC would require $\geq 10^{15}$ codewords (assuming $\geq 10$ word error events). Thus the gain is $$\frac{10^{15}}{11 \times 10^7} \approx 9 \times 10^6$$

It is believed that DAIS's gain increases with decreasing WER.

As code length increases, the dimensionality of $\Gamma$ and its partitions that map to bins of V increases. Hence, maintaining a given level of statistical accuracy in sampling each partition of $\Gamma$ requires more samples for the longer code.

System for Estimating Probability of Occurrence of Events

Figure 6:
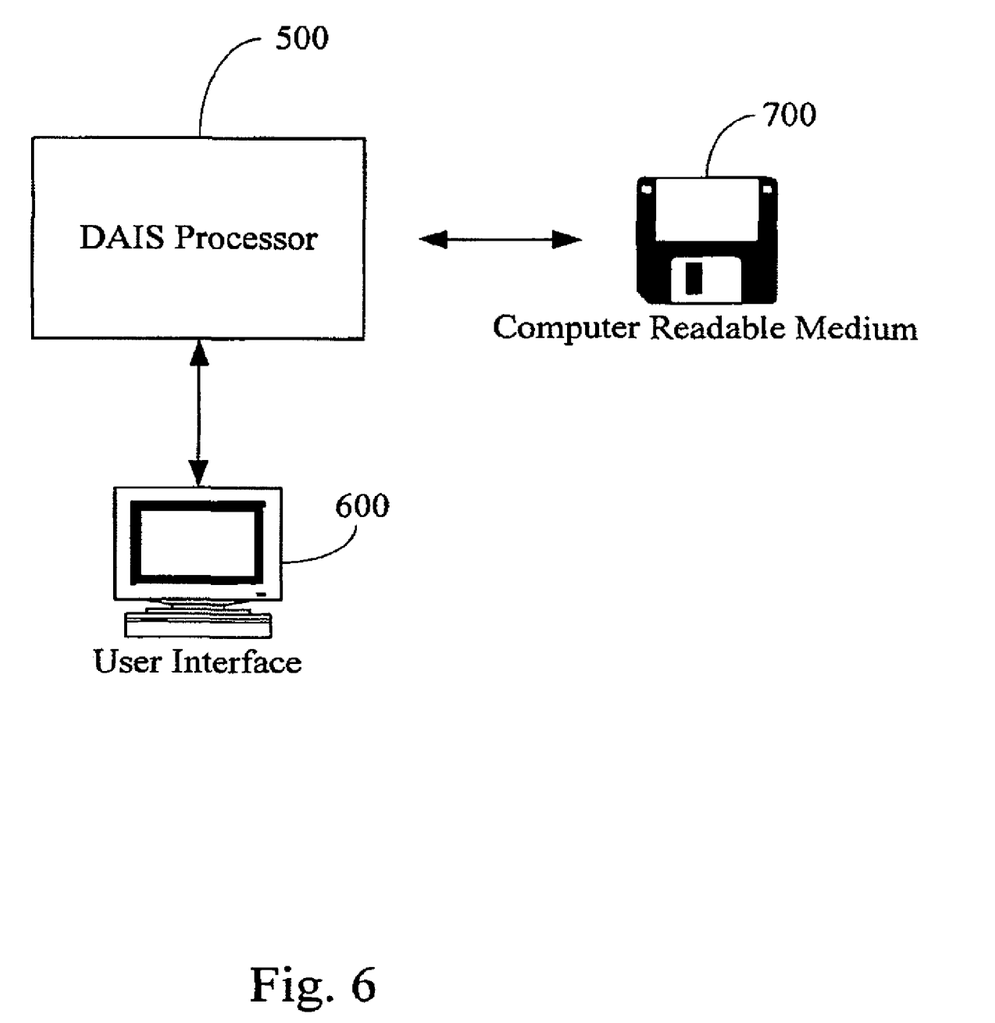
FIG. 6 is a block diagram of a system for estimating the probability of occurrence of events, in accordance with one embodiment of the invention.

FIG. 6 is a block diagram of a system for estimating the probability of occurrence of events, in accordance with one embodiment of the invention. The system includes a DAIS processor 500 and a user interface 600. The DAIS processor 500 is preferably programmed with code for implementing the methods discussed above, and illustrated in FIGS. 1-5. The code can be written in any processor language known in the art, however, it is preferably written in ANSI C.

The code that is used to implement the methods of the present invention can be stored on a computer readable medium 700, such as a hard drive, read-only memory (ROM), random access memory (RAM), or any other type of electronic memory or storage device using any type of media, such as magnetic, optical or other media. Although the computer readable medium 700 in FIG. 6 is shown as separate from the DAIS processor 500, it can be incorporated into the DAIS processor 500.

The DAIS processor 500 can be a general purpose computer. However, the DAIS processor 500 can also be a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of implementing the flowcharts of FIGS. 1-3 can be used to implement the DAIS processor 500.

The user interface 600 is preferably a graphical user interface (GUI) with associated parameter error-checking in order to prevent improper operation of the code due to inappropriate parameter initialization, and make the code user-friendly. The user interface 600 interface preferably accepts code inputs and initializations, provides clear and useful messages to the user in the event that the input parameters are illegal, handles the data processing once the simulations have been completed, and presents the results of the code in a predefined and easily understandable format. The user interface 600 is preferably informative, easy to understand, and capable of providing the user with frequent messages regarding the status of the simulation and guiding the user with step-by-step instructions, wherever possible.

This system and methods of the present invention can be applied to several general classes of problems:

(1) Estimation of very low probability events of the form $E=\{z|g(z)\epsilon G\}$, where g(z) is known analytically or algorithmically, or is representative of an actual system under test, and G is an observable/measurable event;

(2) Evaluation of expectations $E\{g(z)\}$, with $z \square p(z)$ where the largest contributors to $E\{g(z)\}$ come from regions $z \epsilon E$ such that P(E) is very small; and (3) Evaluation of very small integrals $\int_A g(z)\,dz$ where z is non-random and $\int_A dz$ is also very small.

Problem class (1) includes the application addressed above (estimation of BERs/WERs of FEC codes), as well as other communication system simulation problems where extremely small probability events need to be evaluated or simulation time is too long using previous Monte-Carlo-based simulation techniques. It also includes the case where one is testing an actual system (e.g., electromechanical or electro-optical) by both controlling its input z and processing the output data via the methods of the present invention.

Class (1) also includes the case where the algorithmic description of the system or operation g(z) consists of several interconnected subsystems, and requires a large amount of computation time to produce an output for a given input. Problem class (3) is addressed by the present invention via using $\rho(z) \sim$ uniform on the sample space for z.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A system for estimating the probability of occurrence of an event (E), comprising:
   a non-transitory machine readable medium embodying a program of instructions executable by the machine to perform method steps, the method steps comprising,
   performing an adaptive unconstrained estimation of an optimal biased distribution of a multi-dimensional random variable (z) defined on a sample space ($\Gamma$),
   performing an importance-sampling (IS) simulation using the optimal biased distribution for z to yield a first result,
   performing an adaptive constrained estimation of an optimal biased distribution for z over regions of $\Gamma$ where E occurs,
   performing an IS simulation using the optimal biased distribution for z, over regions of $\Gamma$ where E occurs, to yield a second result, and
   estimating the probability of the occurrence of E based on the first and second results.

2. The system of claim 1, wherein the constrained and unconstrained estimations are performed iteratively.

3. The system of claim 1, wherein the event comprises a word error rate for a forward error correcting (FEC) code.

4. The system of claim 3, wherein the FEC code comprises a LDPC code.

5. The system of claim 1, wherein the event comprises a bit error rate for a forward error correcting (FEC) code.

6. The system of claim 5, wherein the FEC code comprises a LDPC code.

7. The system of claim 1, wherein the steps of performing an adaptive unconstrained estimation of an optimal biased distribution for z and performing an IS simulation using the optimal biased distribution for z to yield a first result comprise:
   performing adaptive unconstrained Metropolis simulations to iteratively estimate the optimal biased distribution for z; and
   performing an IS simulation using the optimal biased distribution for z and an unconstrained Metropolis random walk to yield the first result.

8. The system of claim 7, wherein the steps of performing an adaptive constrained estimation of an optimal biased distribution for z over regions of $\Gamma$ where E occurs and performing an IS simulation using the optimal biased distribution for z over regions of $\Gamma$ where E occurs to yield a second result comprise:
   performing adaptive constrained Metropolis simulations to iteratively estimate the optimal biased distribution for z over regions of $\Gamma$ where E occurs; and
   performing an IS simulation using the optimal biased distribution for z over regions of $\Gamma$ where E occurs and a constrained Metropolis random walk to yield the second result.

9. The system of claim 1, wherein the probability of the occurrence of E based on the first and second results is estimated by:
   scaling the second result to fit the first result to yield a scaling factor; and
   estimating the probability of the occurrence of E based on the scaling factor.

10. A system for estimating the probability of occurrence of an event (E), given a known probability distribution ($\rho(z)$) of a multi-dimensional random variable (z) defined on a sample space ($\Gamma$), comprising:
    a non-transitory machine readable medium embodying a program of instructions executable by the non-transitory machine to perform method steps, the method steps comprising,
    determining a scalar mapping (V) from the multi-dimensional sample space to a single-dimensional space,
    defining bins that partition a first range of values of V ($\Gamma_V^u$), such that values of V not in the range of values $\Gamma_V^u$ have a negligible probability of occurrence,
    performing adaptive unconstrained Metropolis simulations to iteratively estimate an optimal biased distribution for z,
    performing an importance-sampling (IS) simulation using the optimal biased distribution for z and an unconstrained Metropolis random walk to yield a first result,
    defining bins that partition a second range of values of V ($\Gamma_V^c$), such that values of V not in the range of values $\Gamma_V^c$ have a negligible contribution to the probability of occurrence of E,
    performing adaptive constrained Metropolis simulations to iteratively estimate an optimal biased distribution for z over regions of $\Gamma$ where E occurs,
    performing an IS simulation using the optimal biased distribution for z over regions of $\Gamma$ where E occurs and a constrained Metropolis random walk to yield a second result, and
    estimating the probability of occurrence of E based on the first and second results.

11. The system of claim 10, wherein the first result comprises estimates of probability distributions p(V) and p(V, E), and the second result comprises an estimate of the probability distribution p(V|E).

12. The system of claim 11, wherein the probability of occurrence of E (P(E)) is estimated by scaling the estimate of p(V|E) to fit the estimate of p(V, E) over a range of values of V where the estimates of p(V|E) and p(V, E) have a predetermined reliability, to yield a scaling factor (SF), wherein SF comprises a first estimate of P(E).

13. The system of claim 12, further comprising integrating [p(V|E)*SF] over $\Gamma_V^c$ to yield a second estimate of P(E), wherein the second estimate is more accurate than the first estimate.

14. A process, comprising:
executing first code with a processor that performs an adaptive unconstrained estimation of an optimal biased distribution for a multi-dimensional random variable (z) defined on a sample space ($\Gamma$);
executing second code with the processor that performs an importance-sampling (IS) simulation using the optimal biased distribution for z to yield a first result;
executing third code with the processor that performs an adaptive constrained estimation of an optimal biased distribution for z over regions of $\Gamma$ where E occurs;
executing fourth code with the processor that performs an IS simulation using the optimal biased distribution for z, over regions of $\Gamma$ where E occurs, to yield a second result; and
executing fifth code with the processor that estimates the probability of the occurrence of E based on the first and second results.

15. A process, comprising:
sending a first result from a first importance-sampling (IS) simulation on a sample space to a processor, wherein the first IS simulation is unconstrained;
sending a second result from a second IS simulation on the sample space to the processor, wherein the second IS simulation is constrained to regions of the sample space where a predetermined event is guaranteed to occur; and
executing code with the processor that scales the second result obtained from the second IS simulation to fit the first result obtained from the first IS simulation to yield a scaling factor.

16. The process of claim 15, wherein the first and second results comprise estimates of first and second probability distributions.

17. The process of claim 15, further comprising executing second code with the processor that determines information about an event based on the scaling factor.

18. The process of claim 17, wherein the information about the event comprises an estimate of a probability of occurrence of the event.

* * * * *